United States Patent [19]

Koslowski et al.

[11] Patent Number: 5,340,513

[45] Date of Patent: Aug. 23, 1994

[54] PROCESS FOR THE PRODUCTION OF CALCIUM HYDROSILICATE BONDED SHAPED ARTICLES

[75] Inventors: Thomas Koslowski, Aachen; Klaus-Michael Hessler, Herzogenrath; Olaf Musebrink, Ubach-Palenberg, all of Fed. Rep. of Germany

[73] Assignee: SICOWA Verfahrenstechnik fur Baustoffe GmbH & Co., KG, Aachen, Fed. Rep. of Germany

[21] Appl. No.: 988,261

[22] Filed: Dec. 14, 1992

[30] Foreign Application Priority Data

Dec. 14, 1991 [DE] Fed. Rep. of Germany ....... 4141271

[51] Int. Cl.$^5$ ............... B29C 67/20; B29C 39/02; B29C 47/00; C04B 14/04
[52] U.S. Cl. .......................... 264/42; 264/82; 264/148; 264/157; 264/160; 264/211.11; 264/333; 264/165; 264/176.1; 106/697; 106/73; 106/792; 106/796; 106/797; 106/805
[58] Field of Search ............. 106/697, 731, 805, 796, 106/797, 792; 264/333, DIG. 19, 165, 176.1, 211.11, 211.12, 42, 82, 148, 157, 160

[56] References Cited

U.S. PATENT DOCUMENTS

| Re. 32,673 | 5/1988 | Schubert et al. | 264/26 |
| 3,352,699 | 11/1967 | Wheeler | 106/723 |
| 3,403,205 | 9/1968 | Ottenholm | 106/697 |
| 3,816,147 | 6/1974 | Vassilevsky | 106/697 |
| 4,376,086 | 3/1983 | Schubert et al. | 264/42 |
| 4,514,162 | 4/1985 | Schulz | 425/174.8 R |
| 4,586,958 | 5/1986 | Matsuura et al. | 106/697 |
| 4,613,472 | 9/1986 | Svanholm | 264/42 |
| 5,196,061 | 3/1993 | Thomas et al. | 106/697 |

FOREIGN PATENT DOCUMENTS 2832125  1/1980  Fed. Rep. of Germany.

Primary Examiner—Anthony Green
Attorney, Agent, or Firm—Cushman, Darby & Cushman

[57] ABSTRACT

A method and composition for the preparation of calcium silicate bounded shaped articles comprising mixing SiO$_2$ containing powder, unslaked or slaked lime, calcium hydroxide, with a waste paper pulper slurry containing cellulosic particle of less than 1.1 mm in length is described. Additionally, Portland cement, alumina cement, calcium sulfate anhydride, plaster of Paris, a foam, and a thermally activated accelerator may also be added to the mixture which is then shaped into blanks, and autoclaved.

9 Claims, No Drawings

PROCESS FOR THE PRODUCTION OF CALCIUM HYDROSILICATE BONDED SHAPED ARTICLES

BACKGROUND OF THE INVENTION

1. Field of the Invention

Many prior art silicate materials have been described in the prior art. Among those described previously are naturally occurring alkali and alkaline earth metal silicates. Additionally, sodium, aluminum and calcium silicate materials have been prepared by a variety of methods including the reaction of sodium silicate with calcium chloride.

2. Description of the Art

The invention relates to a process for the production of calcium hydrosilicate bonded shaped articles, wherein a crude mixture is formed from quartz powder and, if appropriate, a thermally activatable setting accelerator, a pore-forming agent and water and, if appropriate, other additives, the crude mixture is shaped into blanks and the blanks are autoclaved after reaching a sufficient rigidity.

A process of this type is described in U.S. Pat. Nos. 4,376,086 and Re. 32,673, which description is incorporated by reference herein. These patents describe a process wherein a crude mixture is formed from: $SiO_2$-containing powder (e.g., quartz powder and/or fly ash); slaked lime; a thermally activatable setting accelerator (e.g., alumina cement, citric acid anhydrite, hydrated and anhydrous calcium sulphate); Portland cement; a pore-forming agent (e.g., a foam); water; and, if desired, other additives. The crude mixture is shaped into a strand in a continuous strand molding device under the action of heat, and the rigidified strand leaving the continuous strand molding device is cut into inherently stable blanks, which are autoclaved. The pore-forming agents include preprepared foams, for example, those based on protein, with which the crude mixture is rendered porous. This procedure makes it possible to produce lightweight sand-lime bricks and other sand-lime shaped articles having low bulk densities of e.g., 400 to 1000 kg/m$^3$, very high compressive strengths of up to 25 N/mm$^2$, excellent thermal insulation properties, low shrinkage and creep values, and a low capillary water absorption capacity. Further, the shaped articles can be sawed through as needed.

It is also known to produce shaped articles of foam concrete by a similar procedure in which a quartz powder is mixed with Portland cement, unslaked lime, water and a pore-forming agent (e.g., Al powder) or a prepared foam, and the resulting crude mixture is poured into a mould. When the crude mixture is sufficiently rigid, it is cut into blanks in the vertical and horizontal direction and these blanks are then autoclaved. This concrete lank procedure also allows production of shaped articles with low bulk densities, high compressive strengths and excellent thermal insulation properties. Further, these shaped articles can be sawed through as needed.

In the paper industry, waste paper is collected and processed into recycled paper. Recycled paper in turn becomes waste paper, which when processed for recycling leaves material in a waste paper slurry which because of its short fiber length is no longer suitable for the manufacture of recycled paper and has therefore been a waste product to be incinerated or dumped.

Although it is known to use cellulose fibers (e.g., Kraft cellulose, used inter alia as an asbestos substitute) in products such as fiber boards bound with plaster, cement or calcium silicate, for instance in cladding panels (see, e.g., German patent application A-2 832 125), this is not a case of utilizing scrap materials. Rather, products having certain properties such as increased flexural strengths utilize the reinforcing properties of wood fibers which requires a process of incorporating fibers of a minimum fiber length which a waste paper pulper slurry remaining after repeated recycling does not contain. This waste paper pulper slurry is totally unsuitable for such a purpose. For the long cellulose fiber containing products, the raw material is shaped into boards or blocks by means of presses or winding machines in order to attain a good product strength and to reduce the porosity.

For the production of porous articles a pore-forming agent is used. It is known in the art to use a pre-formed foam to be mixed with a raw mixture containing the other concrete ingredients or to use a foaming agent to be mixed with a raw mixture which is then stirred for foaming or to use a gas pores forming agent (Al powder) which upon reaction with calcium hydroxide produce $H_2$ filled pores within the raw mixture.

In the production of paper, wood is disintegrated into fibers which normally range in length between 0.1 to 1 cm or more (up to several cm) which afterwards are present in the paper. If waste paper is disintegrated into its fibers, a certain amount of these fibers are destroyed, i.e., these fibers are reduced to fiber constituents or fiber fragments, which are so small that they can no longer be used for the paper production. These fragments have a length generally smaller than 1 mm. These short fiber fragments are collected as a slurry which normally is a waste product which is incinerated or dumped. The slurry generally has a solids content of about 5 to 15 weight %; however, the cellulosic fiber fragments of the slurry can be swelled as needed by the addition of water to achieve this solid content.

These swelled fiber fragments are uniformly mixed with the other ingredients of the raw mixture from which blanks are formed which are autoclaved to obtain the final products. Within the raw mixture, the fiber fragments form pores consisting substantially of water and of somewhat solid material (swollen cellulose). Within the dried final product the water of the pores is practically eliminated and only the solid content remains. The use of small cellulosic fiber fragments leads to fine pores which are distributed very uniformly within the article. The fine pores formed produce concrete with good structural strength and mechanical properties. The use of cellulosic fiber fragments leads to fine pores which are distributed very uniformly within the article. The fine pores which are distributed very uniformly within the article. The fine pores which are distributed very uniformly within the article. The fine pores formed produced concrete with good structural strength and mechanical properties.

It is an object of the present invention to provide a process which makes it possible to utilize cellulose fiber containing scrap materials in the production of construction materials and to provide uniformly distributed fine pores in concrete products to effect good structural strength and mechanical properties.

This object is achieved by using as the pore-forming agent waste paper slurry consisting of short length cellulosic fibers or fiber constituents, which have been digested in a pulper.

The inventor has discovered that waste paper slurry prepared in a pulper, which contains fibers too short to be used as reinforcing fibers in products including recycled paper, is useful for rendering porous a crude mixture from which calcium hydrosilicate bonded shaped articles can be formed. Additionally, the invention allows advantageous use of materials previously discarded so as to not create environmental problems.

Further, the process of the claimed invention results in a product having very fine "microscopic" pores which can be formed into shaped articles that can be sawed up, can advantageously be nailed, and can be fastened with screws.

DETAILED DESCRIPTION OF THE PRESENTLY PREFERRED EXEMPLARY EMBODIMENTS

In the present claimed invention, the waste paper slurry is digested in a pulper to the point where it has a solids content such that no dewatering takes place during subsequent storage in a supply tank or storage vessel. This is generally the case for a solids content of about 5 to 15% by weight.

A crude mixture of $SiO_2$-containing powder (e.g., quartz powder or fly ash), Portland cement and/or slaked lime and a thermally activatable setting accelerator is prepared, measured and then mixed with the digested waste paper slurry in an amount depending on the desired bulk density of the finished shaped articles, which is generally in the range from 400 to 1000 kg/m$_3$. The crude mixture can be shaped into a strand in a continuous strand molding device, the setting accelerator being activated by appropriate heating, well known in the art, for example by means of high frequency heating, so as to rigidify the strand. The rigidified strand leaving the continuous strand molding device is then cut into blanks which are inherently stable. The blanks are then stacked on hardening wagons and hardened in an autoclave in a saturated steam atmosphere (e.g., at 16 bar).

In carrying out the present invention it is possible to mix the following ingredients:

7.5 to 50 percent by weight of a Si-$O_2$ containing powder;

2.5 to 25 percent by weight unslaked or slaked lime;

35 to 85 percent by weight of a waste paper slurry which contains 5 to 15 percent solids content of cellulose fragments;

0 to 45 percent by weight cement;

0 to 5 percent by weight calcium sulfate anhydride; and 0 to 2 percent by weight of a thermally activatable setting accelerator.

Thereafter, this mixture can be shaped into blanks which are then steam hardened by autoclaving to desired density and compressive strength levels.

Alternatively, it is also possible to work with unslaked lime and Portland cement, as in the case of foam concrete, and hence, if appropriate, without thermally activatable quick-setting cement, in which case the crude mixture is introduced into a mold and a rigidifying hydration reaction of the Portland cement is initiated by the slaking heat of the lime, resulting in the setting of the crude mixture. Here, however, the expansion conventionally observed in the production of foam concrete, due to the formation of gas bubbles by a pore-forming agent, does not take place because the latter is absent and has been replaced with the digested waste paper slurry, so there is only a relatively small expansion caused by the heat of slaking. After release from the mold, the product is cut into inherently stable blanks, which are autoclaved.

According to the present invention, the general process for the production of calcium hydrosilicate bonded articles like blocks or bricks is not changed. This general process as well as the specific ingredients, their respective concentrations or ranges (which change according to the final product) are well known in the art.

The process for production of calcium hydrosilicate bonded shaped articles wherein a short cellulosic fiber pore forming agent is used will now be explained on the basis of the following examples.

EXAMPLES 1

During the disintegration of waste paper in a pulper a fiber slurry with fiber fragments of a length less than 1 mm and solids content of 7 weight % was separated from the disintegrated fibers which remained as not usable for paper production. This slurry was introduced into a high power mixer. Quartz powder (having a specific surface according to Blaine of about 2200 cm,/g), commercial calcium hydroxide and Portland cement were added to prepare a homogenous slurry therefrom. Separately therefrom a dilute mixture of alumina cement (50% aluminum oxide), calcium sulfate anhydride (with a specific surface according to Blaine of about 700 to 1000 cm$^2$/g), a commercial plaster of Paris, citric acid anhydrite and water by stirring during 1 minute. This dilute mixture was added to the slurry in the mixed and mixed therewith uniformly. A raw mixture was produced having a processing time of about 30 minutes at 25° C.

A m$^3$ of the raw mixture quantitatively contained:

| | |
|---|---|
| waste paper slurry (solids content 7%) | 834.7 kg |
| quartz powder | 218.0 kg |
| calcium hydroxide | 76.0 kg |
| Portland cement | 80.0 kg |
| alumina cement | 25.0 kg |
| calcium sulfate anhydride | 14.0 kg |
| plaster of Paris | 2.8 kg |
| citric acid anhydrite | 0.9 kg |

The raw mixture was then formed to an endless strand by a continuously working strand forming device (as described in U.S. Pat. No. 4,514,162, incorporated by reference herein) by which the raw mixture was heated by high frequency energy from about 25° C. to about 50° C. which activates the thermally activatable setting accelerator (dilute mixture as prepared above) so that the strand was accelerated into hardening and the emerging strand was stackable in its form. The strand was then cut into brick blanks which were stacked onto wagons and introduced into an autoclave where the blanks were treated for about 12 hours with saturated steam of about 10 bar.

The final bricks had the following characteristics:

| | |
|---|---|
| crude density | 500 kg/m$^3$ |
| compressive strength (at 10 volume % moisture content) | 4.1–4.3 Newton/mm$^2$ |
| bonding strength (at 10 volume % moisture content) | 1.9–2.2 Newton/mm$^2$ |

EXAMPLE 2

A raw mixture was prepared and handled as in Example 1, a m³ of this raw mixture quantitatively containing:

| | |
|---|---|
| waster paper slurry (solids content 7%) | 721.6 kg |
| quartz powder | 430.0 kg |
| calcium hydroxide | 150.0 kg |
| Portland cement | 80.0 kg |
| alumina cement | 25.0 kg |
| calcium sulfate anhydride | 14.0 kg |
| plaster of Paris | 2.8 kg |
| citric acid anhydrite | 0.9 kg |

The final bricks had the following characteristics:

| | |
|---|---|
| crude density | 800 kg/m3 |
| compressive strength (at 10 volume % moisture content) | 18.5 Newton/mm² |
| bending strength (at 10 volume % moisture content) | 6.7 Newton/mm² |

EXAMPLE 3

A raw mixture was prepared and handled as in Example 1, a m³ of this raw mixture quantitatively containing:

| | |
|---|---|
| waste paper slurry (solids content 7%) | 698.0 kg |
| fly ash | 510.0 kg |
| calcium hydroxide | 160.0 kg |
| alumina cement | 25.0 kg |
| calcium sulfate anhydride | 14.0 kg |
| plaster of Paris | 3.0 kg |
| citric acid anhydrite | 1.3 kg |

The final bricks had the following characteristics:

| | |
|---|---|
| crude density | 800 Kg/m³ |
| compressive strength (at 10 volume % moisture content) | 12.5 Newton/mm² |
| bending strength (at 10 volume % moisture content) | 5.1 Newton/mm² |

What is claimed is:

1. A method for producing calcium hydrosilicate bonded articles comprising the steps of:
   (a) forming a mixture containing:
      a quartz containing powder;
      calcium hydroxide;
      a pulper digested paper slurry containing cellulose fiber fragments and short cellulose fibers in a swelled state as a pore forming agent; and
      a cementitious agent;
   (b) shaping the resulting mixture of step (a) into blanks; and
   (c) steam hardening the shaped blanks by autoclaving.

2. A method as in claim 1 wherein step (b) comprises the additional steps of extruding the mixture resulting from step (a) in a continuous strand and heating the continuous strand.

3. A method as in claim 1 wherein step (b) comprises placing the mixture resulting from step (a) into molds where the articles are shaped.

4. A method as in claim 1 wherein step (a) further includes a thermally activatable setting accelerator.

5. A method as in claim 2 wherein the continuous strand is cut into segments.

6. A method as in claim 3 wherein the articles are shaped as bricks.

7. The method as in claim 1 wherein the mixture formed in step(a) includes:
   7.5 to 50 percent by weight of the quartz containing powder;
   2.5–25 percent by weight of the calcium hydroxide;
   35–85 percent by weight of the pulper digested paper slurry containing
   5 to 15 percent solids content of which at least 20 percent by weight comprises cellulose fiber fragments and short cellulose fibers in a swelled state as a pore forming agent; and
   0–45 percent by weight of the cementitious agent.

8. The method as in claim 1 wherein the cellulose fiber fragments and short fibers have lengths less than 1 mm.

9. Products formed according to the method of claim 1.

* * * * *